(12) United States Patent
Kasuga et al.

(10) Patent No.: US 7,056,543 B2
(45) Date of Patent: Jun. 6, 2006

(54) METHOD OF BREWING SOY SAUCE

(75) Inventors: Masashi Kasuga, Kasukabe (JP);
Atsuo Yaginuma, Noda (JP); Shizuya Ohkubo, Nagareyama (JP); Nobutake Nunomura, Kitasoma-gun (JP); Isao Kimura, Sashima-gun (JP); Machiko Watanabe, Noda (JP)

(73) Assignee: Kikkoman Corporation, Noda (JP)

( * ) Notice: Subject to any disclaimer, the term of this patent is extended or adjusted under 35 U.S.C. 154(b) by 0 days.

(21) Appl. No.: 10/323,625

(22) Filed: Dec. 20, 2002

(65) Prior Publication Data

US 2003/0129277 A1    Jul. 10, 2003

(30) Foreign Application Priority Data

Dec. 21, 2001    (JP) .............................. 2001-388748

(51) Int. Cl.
    *A23B 9/28*    (2006.01)
(52) U.S. Cl. ...................................... 426/46
(58) Field of Classification Search .................. 426/46, 426/60, 62, 589, 634, 650
    See application file for complete search history.

(56) References Cited

U.S. PATENT DOCUMENTS 4,308,284 A    12/1981    Noda et al.
4,722,846 A    2/1988    Abe et al.

FOREIGN PATENT DOCUMENTS

JP    5-227914    9/1993
JP    2000-245443    9/2000

OTHER PUBLICATIONS

Patent Abstracts of Japan, JP 58-141761, Aug. 23, 1983.
Patent Abstracts of Japan, JP 2-295479, Dec. 6, 1990.
Patent Abstracts of Japan, JP 54-105298, Aug. 18, 1979.
Patent Abstracts of Japan, JP 55-023980, Feb. 20, 1980.
Patent Abstracts of Japan, JP 9-191850, Jul. 29, 1997.
Patent Abstracts of Japan, 2-079953, Mar. 20, 1990.
WPI Abstract, AN 1989-042116, JP 63-313560, Dec. 21, 1988.
T. Hamada, et al., Process Biochemistry, vol. 26, No. 1, pp. 39-45, "Continuous Production of Soy Sauce by a Bioreactor System", 1991.
H. Nishijima, et al., Journal of the Society of Brewing, vol. 71, No. 12, pp. 960-965, "Salt-Limited Soy Sauce. I. Production of the Salt-Limited Soy Sauce by a Fermentation Method", 1976 (submitting Abstract only).
T. Yokotsuka, Quality of Foods and Beverages. Chemistry and Technology, vol. 2, pp. 171-196, "Recent Advances in Shoyu Research", 1981.

*Primary Examiner*—Keith Hendricks
(74) *Attorney, Agent, or Firm*—Oblon, Spivak, McClelland, Maier & Neustadt, P.C.

(57) ABSTRACT

According to the present invention, there is reliably provided a soy sauce having desired ethanol and lactic acid concentrations and a mellow flavor. A method of brewing soy sauce which comprises mixing soy sauce koji into a salt water to prepare a soy sauce moromi mash, adding pre-cultured soy sauce lactic acid bacteria and soy sauce yeast to the moromi mash, performing fermentation and aging of the moromi mash after adding by ordinary techniques, wherein the soy sauce yeast is added to the soy sauce moromi mash within 10 days after mixing such that the cell count of the soy sauce yeast is 10 to 100 fold greater than that of wild yeast already existing in the moromi mash and is $2 \times 10^5$ or less cells/g moromi mash to the soy sauce moromi mash, so that the desired soy sauce is obtained.

9 Claims, No Drawings

METHOD OF BREWING SOY SAUCE

FIELD OF THE INVENTION

The present invention relates to an improvement of a method of brewing soy sauce which comprises mixing soy sauce koji into a salt water to prepare a soy sauce moromi mash, adding pre-cultured soy sauce lactic acid bacteria and soy sauce yeast to the moromi mash, and performing fermentation and aging of the moromi mash after adding by ordinary techniques, and relates to a method of reliably obtaining soy sauce having a desired ethanol concentration and lactic acid concentration and having a mellow flavor.

BACKGROUND OF THE INVENTION

A traditional method of brewing soy sauce comprises admixing steamed soybean products with roasted and milled wheat, inoculating the mixture with seed koji mold for soy sauce, and culturing the mixture to obtain soy sauce koji, adding an appropriate amount of a salt water to the soy sauce koji to obtain a soy sauce moromi mash, fermenting and aging for a certain time period the moromi mash to obtain a aged moromi mash, and finally press-filtering the aged moromi mash. However, the fermentation and aging of a soy sauce moromi mash are normally performed in an open system, and almost no microorganism, such as soy sauce yeast or soy sauce lactic acid bacteria, are artificially added. Hence, all of the microorganisms (yeast and lactic acid bacteria) acting in the moromi mash are derived by natural contamination from the natural flora inhabiting the brewing sites, facilities, instruments or the like.

In the present invention, the term "wild yeast" indicates yeast which inhabits sites, facilities, instruments and air and the like for brewing soy sauce, and naturally contaminates and proliferates in a soy sauce moromi mash.

In contrast soy sauce yeast used in the present invention is easily collected (separated) from a soy sauce moromi mash and the like by a known ordinary means, and preferably is highly capable of producing alcohol and being salt-tolerant. The soy sauce yeast is pure cultured artificially and added to a soy sauce moromi mash. The thus pre-cultured soy sauce yeast is clearly distinguished horn wild yeast.

The natural flora is greatly diversified, so that naturally contaminated soy sauce yeast and soy sauce lactic acid bacteria may contain bacteria having properties that are not exactly favorable in terms of soy sauce quality. Further, there are disadvantages due to the differences in the composition of the natural flora depending on area or with time, such that the product quality varies depending on the brewing site, and that soy sauce having uniform quality cannot always be obtained throughout the year.

From these viewpoints, to constantly produce brewed soy sauce having a uniform quality regardless of area or time constraints, a method of brewing soy sauce has been developed. This method of brewing soy sauce comprises mixing soy sauce koji into a salt water to prepare a soy sauce moromi mash; adding pre-cultured soy sauce lactic acid bacteria and soy sauce yeast to the moromi mash; and then performing fermentation and aging of the moromi mash after adding by ordinary techniques.

Specifically, a known method comprises mixing soy sauce koji into a salt water to prepare a soy sauce moromi mash, adding pre-cultured soy sauce lactic acid bacteria to the moromi mash, culturing the bacteria, adding soy sauce yeast (mainly *Zygosaccharomyces rouxii*, the main soy sauce fermentation yeast) when the cell count of the lactic acid bacteria in the moromi mash exceeds $10^7$ cells/g moromi and the pH of the moromi decreases to 5.1 to 5.2 as lactic acid fermentation proceeds (normally at 20 to 40 days after mixing), performing ethanol fermentation, and thus brewing soy sauce having good flavor (Science and Technique of Soy Sauce, edited and written by Shinrokuro TOCHIKURA, BREWING SOCIETY OF JAPAN, 1988) (food Microbiology Hand Book, edited and written by Hisao YOSHII, Yasuyuki KANEKO and Kazuo YAMAGUCHI, Giho-do, 1995).

However in this method, since non-sterile koji is used and fermentation and aging are performed in a microbiologically open vessel, lactic acid fermentation and yeast fermentation for a soy sauce moromi mash is easily contaminated with wild microorganisms due to complex troubling factors that cannot be specified. Thus, it is very difficult to maintain a stable and balanced growth of these added microorganisms over a long period while maintaining preferred fermentation.

Moreover under pure culture conditions, there is a disadvantage that although the main soy sauce fermentation yeast strains having high ethanol productivity or being capable of forming good soy sauce aroma are obtained when these strains are positively used in an actual brewing process, results that can be obtained under a pure culture condition cannot be obtained in many cases.

Accordingly, in recent years, efforts have been made to achieve balanced and stable long term growth of the added soy sauce yeast and lactic acid bacteria, so as to maintain preferred yeast fermentation and lactic acid fermentation. Specifically, fermentation and aging of a moromi mash are controlled in the latest, sealed and independent type mixing and fermentation tanks to prevent scattering or contaminating the moromi mash within each mixing and fermentation tank and among adjacent mixing and fermentation tanks, and mixing and fermentation tanks or mixing and fermentation pathways (paths) are cleaned after every use.

However, this method also has a disadvantage because of unstable pH decreases associated with lactic acid fermentation due to, for example, different lots of soy sauce koji or moromi mashes differing from each other, so that there is no other choice but to judge a good timing for addition of yeast depending on the experience and feel of experts.

Further, there is a limit to completely eliminate microorganisms from cleaned mixing and fermentation tanks or mixing and fermentation pathways. Thus, there is a disadvantage that when salt-tolerant wild yeast cannot be eliminated, small numbers of this wild yeast may remain and contaminate a soy sauce moromi mash, and may grow to be dominant before the addition of soy sauce yeast, thus not only is lactic acid fermentation suppressed, but also unfavorable odor is generated by the wild yeast.

Furthermore, yeast to be added should have been previously cultured to a required quantity and stored. There is a disadvantage that when an expected timing for addition of yeast is significantly varied earlier or later the predicted time, shortages of yeast to be added or decreased yeast activity may result, so that yeast fermentation is not performed immediately after addition to a moromi mash.

SUMMARY OF THE INVENTION

An object of the present invention is to reliably obtain soy sauce having a desired ethanol concentration (for example, 3% (V/V) or higher) and a desired lactic acid concentration (0.8 to 1.0% W/V)), pH 4.6 to 4.9, and having a mellow flavor by solving the above-mentioned disadvantages with a method of brewing soy sauce which comprises mixing soy sauce koji into a salt water to prepare a soy sauce moromi mash, adding pre-cultured soy sauce lactic acid bacteria and soy sauce yeast to the moromi mash, performing fermentation and aging of the moromi mash after adding by ordinary techniques.

As a result of focused research conducted to solve the above problems, the present inventors have found that by noticing the cell count of salt-tolerant wild yeast in a soy sauce moromi mash at an early stage of fermentation, addition of viable soy sauce yeast by 10 fold to 100 fold cell count greater than that of the wild yeast to the soy sauce moromi mash provides effects of suppressing the growth of the wild yeast without affecting lactic acid fermentation, allowing active growth of only the added soy sauce yeast, and allowing successful ethanol fermentation. Further, the present inventors have found that when the soy sauce yeast is added to the soy sauce moromi mash within 10 days after mixing such that the cell count of viable soy sauce yeast is 10 to 100 fold greater than that of wild yeast already existing in the moromi mash, the addition of extremely small numbers of soy sauce yeast is sufficient to provide the above effects. In addition, the present inventors have found that during this time, if the amount of added soy sauce yeast exceeds $2\times10^5$ cells/g moromi, fermentation by lactic acid bacteria coexisting in the soy sauce moromi mash is affected, so that lactic acid is not generated and accumulated, resulting in soy sauce with poor flavor. Moreover, the present inventors have found that if when soy sauce yeast is added at a ate of $2\times10^5$ or less cells/g moromi such that the cell count of the soy sauce yeast is 10 to 100 fold greater than that of the wild yeast already existing in a moromi mash, ethanol fermentation by soy sauce yeast is sufficiently performed without suppressing lactic acid fermentation, and soy sauce having a desired ethanol concentration (for example, 3% (V/V) or higher), a desired lactic acid concentration (for example, 0.8 to 1.0%), pH 4.6 to 4.9, and a mellow flavor can be reliably obtained.

The present invention has been completed by these findings. Specifically, the present invention is a method of brewing soy sauce which comprises the steps of: mixing soy sauce koji into a salt water to prepare a soy sauce moromi mash; adding pre-cultured soy sauce lactic acid bacteria and soy sauce yeast to the moromi mash; and performing fermentation and aging of the moromi mash after adding by ordinary techniques, wherein the soy sauce yeast is added to the soy sauce moromi mash such that the cell count of the soy sauce yeast is 10 to 100 fold greater than that of wild yeast already existing in the moromi mash.

The present invention is a method of brewing soy sauce which comprises the steps of mixing soy sauce koji into a salt water to prepare a soy sauce moromi mash; adding pre-cultured soy sauce lactic acid bacteria and soy sauce yeast to the moromi mash; and performing fermentation and aging of the moromi mash after adding by ordinary techniques, wherein the soy sauce yeast is added to the soy sauce moromi mash within 10 days mixing such that the cell count of the soy sauce yeast is 10 to 100 fold greater than that of wild yeast already existing in the moromi mash.

Further, the present invention is a method of brewing soy sauce which comprises the steps of mixing soy sauce koji into a salt water to prepare a soy sauce moromi mash; adding pre-cultured soy sauce lactic acid bacteria and soy sauce yeast to the moromi mash; and performing fermentation and aging of the moromi mash after adding by ordinary techniques, wherein the soy sauce yeast is added to the soy sauce moromi mash within 10 days after mixing such that the cell count of the soy sauce yeast is 10 to 100 fold greater than that of wild yeast already existing in the moromi mash and is $2\times10^5$ or less cells/g moromi mash.

This specification includes part or all of the contents as disclosed in the specification and/or drawings of Japanese Patent Application No. 2001-388748, which is a priority document of the present application.

DETAILED DESCRIPTION OF THE INVENTION

The present invention will be described in detail as follows.

To carry out the present invention, first, soy sauce koji, prepared according to ordinary methods of producing soy sauce koji, is mixed into a salt water according to ordinary methods of brewing soy sauce.

The amount of a salt water to be used herein is 1 to 3 fold greater than the weight of soy sauce koji raw materials. The concentration of common salt to be used herein is appropriately adjusted for brewed soy sauce to have 15 to 20% (W/V), and preferably, 16 to 18 (W/V) % of common salt concentration. It is important to adjust the concentration of common salt upon mixing within the above range, because an unfavorable common salt concentration of less than 15% would likely cause the putrefaction of a soy sauce moromi mash at a summer temperature ranging from 25 to 35° C. It is true that lower concentrations of common salt of a soy sauce moromi mash is better for enzyme reaction to proceed more successfully, and for proliferation and fermentation of soy sauce lactic acid bacteria and soy sauce yeast to proceed more smoothly, so that the moromi mash is lysed and matures more rapidly. However, in this case, with a common salt concentration of less than 15%, so-called putrefactive bacteria actively grow, acidic odor and sourness are significantly produced, and finally the product completely loses its value as soy sauce. Putrefaction of a soy sauce moromi mash due to inappropriate concentrations of common salt can be prevented by setting conditions, such as maintaining moromi mash temperature at 40° C. or higher, or adjusting pH to 3.0 or less by adding acid, such as hydrochloric acid or lactic acid thereto. However, these conditions also deteriorate the original flavor of soy sauce, so that the product loses its value as soy sauce. As such, when the temperature or pH for a moromi mash or when the nitrogen concentration of a moromi mash liquid is inappropriate for the proliferation or survival of putrefactive bacteria, a moromi mash does not putrefy even when the concentration of common salt is low. However, these are consistently special cases, and it cannot be said that these are general methods of brewing soy sauce. Unless otherwise when the concentration of common salt is 17% or higher during the summer season, or 15% or higher during the spring or fall season, successful fermentation and aging cannot be achieved. In addition, a method which involves hydrolyzing a soy sauce moromi mash at 40° C. or higher has a disadvantage that an unpleasant odor, the so-called warm-brew odor, is affixed to soy sauce.

Next, previously-selected or specially-bred soy sauce lactic acid bacteria and soy sauce yeast having good properties (hereinafter, referred to as "main say sauce fermentation yeast" on some occasions) are added to the thus prepared soy sauce moromi mash. In addition, soy sauce lactic acid bacteria may be added according to ordinary methods of brewing soy sauce, at $1\times10^4$ cells/g moromi to $1\times10^7$ cells/g moromi.

It is important in the present invention that soy sauce yeast is added such that the cell count of soy sauce yeast is 10 to 100 fold greater than that of wild yeast already existing in a moromi mash. When the rate is less than 10 fold, there is a danger that wild yeast that is coexisting in a soy sauce moromi mash becomes relatively more numerous, the soy sauce yeast strains having a good property that have been added to the moromi mash cannot grow actively due to competition against groups of wild yeast groups co-existing in the moromi mash, and thus the soy sauce yeast may be eliminated or expelled as a result of the competitive growth inhibition.

In contrast, when the rate is more than 100 fold, co-existing lactic acid bacteria cannot grow actively, so that brewed soy sauce having a desired lactic acid concentration, appropriate pH (for example, pH 4.6 to 4.9), and mellow flavor cannot be obtained.

Further, a timing for addition of pre-cultured soy sauce lactic acid bacteria and soy sauce yeast is preferably within 10 days after mixing, and is more preferably within 7 days after mixing. The most preferred timing for addition is at the time of mixing (immediately after mixing) to next day after mixing. This range is preferred because the use of this range can greatly save the amount of soy sauce yeast to be added.

In contrast, when soy sauce yeast is added post-mixing on day 11 or later, a greater number of wild yeast would co-exist in the soy sauce moromi mash. In this case, a larger amount of soy sauce yeast must be added. As a result, as the concentration of the yeast becomes higher, and the growth of lactic acid bacteria would be inhibited. Thus, there will be a danger of producing soy sauce having low lactic acid content and poor flavor. Moreover, there is a danger that the soy sauce yeast (the main soy sauce fermentation yeast strain having good properties) that has been added to the soy sauce moromi mash may not be able to grow actively due to competition with wild yeast that are co-existing in the moromi mash, and thus the soy sauce yeast may be eliminated or expelled as a result of competitive growth inhibition by wild yeast. That is, there is a danger that because the soy sauce yeast may not be able to actively proliferate, the problems of the present invention cannot be solved.

It is important that the amount of the soy sauce yeast to be added is at a rate of $2\times10^5$ or less cells/g moromi. When the amount is at a rate of $2\times10^5$ cells/g moromi or higher, lactic acid bacteria may not be able to proliferate actively. Thus, there is a fear that soy sauce having a desired lactic acid concentration, appropriate pH (for example, pH 4.6 to 4.9) and mellow flavor cannot be obtained.

Examples of soy sauce yeast that is used in the present invention include salt-tolerant soy sauce yeast groups involved in brewing soy sauce, such as: the main soy sauce fermentation yeast belongs to taxonomically to a strain of *Zygosaccharomyces rouxii* and mainly contributes to ethanol fermentation of a soy sauce moromi mash by remarkable ability of ethanol fermentation in the presence of 6 to 28 (W/V) % sodium chloride and glucose; salt-tolerant yeast groups belonging to the genus *Candida* including *Candida versatilis* and *Candida etchellsii*; or salt-tolerant yeast groups of the genus *Torulopsis* which start to act when ethanol fermentation by the soy source main fermentation yeast is completed, and are mainly involved in the generation of typical aroma of soy sauce, and once-called after-ripening yeast groups.

Of these yeast groups, the main soy source fermentation yeast having active ethanol fermentation ability is preferred to obtain soy sauce having 3% (V/V) or higher ethanol concentration and mellow flavor, in particular.

According to the studies of the present inventors, the main soy sauce fermentation yeast cannot be regarded collectively because they differ in their properties depending on strains. That is, different strains of the main soy sauce fermentation yeast largely differ in the proliferation ability and ethanol fermentation ability in a soy sauce moromi mash.

In an ordinary moromi mash which is obtained by fermentation and aging processes performed under an open system, numerous strains of wild yeast co-exist and form the main soy sauce fermentation yeast flora. However, not all of the main soy sauce fermentation yeast strains are equally involved in ethanol fermentation for a soy sauce moromi mash. That is, only a small number of strains of these fermentation yeast strains are mainly responsible for ethanol fermentation.

The wild yeast strains can contain microorganism having properties which are not necessarily preferable in terms of soy sauce quality. Further, there is a disadvantage due to the differences in the composition depending on area or with time, such that product quality varies depending on the brewing site, or soy sauce having uniform quality cannot always be obtained throughout the year.

Therefore, it is very important to suppress the growth of wild yeast so as to maintain active growth of the added soy sauce yeast.

According to the above conditions for addition of yeast of the present invention, when soy sauce yeast (a certain main soy sauce fermentation yeast strain) is added into a soy sauce moromi mash, the soy sauce yeast strain compete with the other strains to survive and is not eliminated as a result of the competition, so that the soy sauce yeast strain can actively grow under culturing conditions wherein the soy sauce yeast strains co-exists with the wild yeast strains.

Next, a moromi mash to which soy sauce lactic acid bacteria and soy sauce yeast are added is controlled by appropriate agitation according to the following ordinary methods of brewing soy sauce. Then, by ordinary techniques, the moromi mash is allowed to ferment and mature at a maintained room temperature of 15 to 35° C., preferably, 20 to 30° C. for 3 to 8 months, preferably, 4 to 6 months.

The thus obtained mature moromi mash is pressed, filtered, and then refined so that soy sauce having a desired ethanol concentration (for example, 3 (V/V) % or higher), lactic acid concentration (for example, 0.9 to 1.0 (V/V) %), appropriate pH (pH 4.6 to 4.9) and mellow flavor is obtained.

EXAMPLE

Below the present invention is explained in more detail by way of Examples.

Soy sauce yeast used in following examples is yeast easily extracted (separated) from soy sauce moromi mash by a known ordinary means. The yeast has the ability of producing and accumulating 3.0 (V/V) % or higher of alcohol by performing alcoholic fermentation actively in soy sauce moromi of 16.5 (W/V) % of salt concentration, Example 1

25% (W/V) salt water (30 liters) was admixed with soy sauce koji (20 kg) prepared according to ordinary methods of producing soy sauce koji, thereby preparing a soy sauce moromi mash. The prepared moromi mashes were introduced into a mixing and fermentation vessels.

The above procedures were performed by sterilizing the koji-making device and the mixing and fermentation vessels using heated steam so as to prevent contamination by wild microorganisms (wild yeast, lactic acid bacteria and the like) as far as possible.

After the soy sauce moromi mashes were prepared, according to an ordinary method for brewing soy sauce, the moromi mashes were maintained at a temperature of 20 to 25° C. for 5 months with occasional agitation so as to perform fermentation and aging.

On the other hand, time-dependent increases and decreases of wild yeast in the soy sauce moromi mash obtained in the above procedure had been studied, so as to understand the number of wild yeast next day after mixing.

Next day after mixing, the moromi mash was agitated, and soy sauce yeast (pure culture solution) and soy sauce lactic acid bacteria (pure culture solution) were added so as to achieve conditions stated in Table 1. In addition, the same amount of lactic acid bacteria was added in all the experiments such that lactic acid bacteria were added at $1 \times 10^6$ cells/g moromi. In test numbers 6 and 9, the specified amount of the culture solution of the wild yeast separated from above soy sauce moromi was added. In other test numbers, the culture solution of the wild yeast was not added. The thus obtained mature moromi mash liquids were collected, and then the composition of each liquid was analyzed. Further, organoleptic tests were conducted for each. Table 1 shows the results.

Measurement of viable cell count in Table 1 was performed according to the method described in "Food Microbiology Handbook" (edited and written by Hisao YOSHII, Yasuyuki KANEKO and Kazuo YAMAGUCHI, Giho-do, p. 603).

Component analysis of soy sauce in Table 1 was performed according to the method described in "Experimental Method for Soy Sauce" (ed. THE JAPAN SOY SAUCE INSPECTION INSTITUTE, issued on Mar. 1, 1985).

are eliminated as a result of competitive growth inhibition against the groups of wild yeast co-existing in the moromi mash, and thus continuous ethanol fermentation cannot be vigorously carried out.

(2) It is clear that in the test of comparative examples 2 and 3 wherein the rates for adding soy sauce yeast was 200 fold and 400 fold, respectively, lactic acid concentration was significantly lower. Thus, it was suggested that soy sauce having its unique mellow flavor cannot be obtained.

(3) It is also clear that even when the rate for adding soy sauce yeast was 100 fold, as in the test of comparative example 4 wherein more than $2 \times 10^5$ cells/g moromi soy sauce yeast was present lactic acid concentration was significantly lower. Thus it was suggested that soy sauce having the desired lactic acid concentration, appropriate pH (for example, pH 4.6 to 4.9), and a mellow flavor cannot be obtained.

(4) In contrast to these results, in the five tests of the present invention wherein the cell count of the soy sauce yeast was 10 to 100 fold greater than that of the others and soy sauce yeast was added at a rate of $2 \times 10^5$ or less cells/g moromi, ethanol fermentation was vigorously carried out by the soy sauce yeast added, so that soy sauce having as high as 3.0% (V/V) or higher, or in particular, as high as 3.5% (V/V) or higher of a targeted ethanol concentration can be obtained. Moreover, it is clear that lactic acid fermentation by soy sauce lactic acid bacteria is preferably performed, so that soy sauce having an appropriate lactic acid content and showing a pH of 4.8 to 4.9 can be obtained. Thus, it can be

TABLE 1

| Test No. | Item | Salt-tolerant wild yeast (A) | Cultured yeast (B) | B/A (amplification) | Component analysis | | | Aroma | Taste | Evaluation |
|---|---|---|---|---|---|---|---|---|---|---|
| | | | | | Alc | Lac | pH | | | |
| 1 | Comparative example 1 | $1 \times 10^3$ | $5 \times 10^3$ | 5 | 2.80 | 1.06 | 4.77 | Δ | ○ | Acidic odor |
| 2 | Present invention | $1 \times 10^3$ | $1 \times 10^4$ | 10 | 3.47 | 0.94 | 4.85 | ◎ | ◎ | Good flavor |
| 3 | Present invention | $1 \times 10^3$ | $2.5 \times 10^4$ | 25 | 3.53 | 0.90 | 4.86 | ◎ | ◎ | Good flavor |
| 4 | Present invention | $1 \times 10^3$ | $5 \times 10^4$ | 50 | 3.50 | 0.92 | 4.86 | ◎ | ◎ | Good flavor |
| 5 | Present invention | $1 \times 10^3$ | $1 \times 10^5$ | 100 | 3.55 | 0.88 | 4.88 | ◎ | ◎ | Good flavor |
| 6 | Present invention | $2 \times 10^3$ | $2 \times 10^5$ | 100 | 3.65 | 0.85 | 4.89 | ◎ | ○ | Good flavor |
| 7 | Comparative example 2 | $1 \times 10^3$ | $2 \times 10^5$ | 200 | 3.67 | 0.30 | 5.10 | ○ | Δ | Fuzzy |
| 8 | Comparative example 3 | $1 \times 10^3$ | $4 \times 10^5$ | 400 | 3.60 | 0.08 | 5.28 | ○ | X | Off-taste |
| 9 | Comparative example 4 | $2.5 \times 10^3$ | $2.5 \times 10^5$ | 100 | 3.62 | 0.35 | 5.08 | ○ | Δ | Fuzzy |

Alc represents Ethanol, and Lac represents Lactic acid.
Symbols in columns of "aroma" and "flavor": ◎ Very good   ○ Good   Δ Somewhat poor   X Poor The following facts are clear from the results in Table 1.

(1) It is clear that in the test of comparative example 1 wherein the rate for adding soy sauce yeast was 5 fold, the resulting mature moromi mash had acidic odor, suggesting that soy sauce having a mellow flavor cannot be obtained. Specifically, it is predicted that when the rate for adding soy sauce yeast is less than 10 fold, wild yeast co-existing in a soy sauce moromi mash becomes relatively greater in number, thus the soy sauce yeast strains having a good property are difficult to survive, and thus the soy sauce yeast strains understood that soy sauce having characteristic aromas and good flavors can be obtained as a whole.

Example 2

8 tests utilizing 20 kg of soy sauce koji, each prepared according to ordinary methods of producing soy sauce koji, were prepared. The soy sauce koji and 25% (W/V) salt water (30 litters) were added respectively to 8 fermentation vessels, and then mixed to prepare soy sauce moromi mashes. Immediately after mixing, soy sauce lactic acid bacteria isolated from the soy sauce moromi mash were added at $1\times10^6$ cells/g moromi, and a wild yeast was added at a rate of $2\times10^3$ cells/g moromi, and then the moromi mashes were controlled according to ordinary methods of brewing soy sauce, so that fermentation and aging were performed.

On the other hand, time-dependent increases and decreases of wild yeast in the soy sauce moromi mash obtained in the above procedure had been studied, so as to understand the number of wild yeast 1, 3, 5, 7, 10, 12 and 20 days after mixing.

Next, except for $1^{st}$ test, soy sauce yeast described in Table 2 was respectively added post-fermentation to a $2^{nd}$ test on day 1, $3^{rd}$ test on day 3, $4^{th}$ test on day 5, $5^{th}$ test on day 7, $6^{th}$ test on day 10, $7^{th}$ test on day 12, and $8^{th}$ test on day 20. The mixing and fermentation vessels were placed in a temperature-controlled room at 23° C., and then the moromi mashes were controlled for 5 months according to ordinary methods of brewing soy sauce, so that fermentation and aging were performed.

The thus obtained mature moromi liquids were collected, and then subjected to analysis and organoleptic evaluation in the manner similar to Example 1. Table 2 shows the results.

moromi. In the method according to the present invention, when wild yeast was added, good cultured yeast was added at $1\times10^4$ cells/g moromi such that the cell count of the soy sauce yeast was 10 fold greater than that of the wild yeast in a control method, when the pH of the moromi mash became 5.2 or less, good cultured yeast was added at a rate of $2\times10^5$ cells/g moromi. Each addition was performed 5 times. Table 3 shows lactic acid levels (W/V %) of the moromi mash liquid at 135 days after mixing. In addition, the temperature of the moromi mash was the same as in Example 1.

TABLE 3

| | Lactic acid (W/V) % | |
|---|---|---|
| Experiment No. | Control | Present invention |
| 1 | 1.00 | 0.95 |
| 2 | 0.91 | 0.93 |
| 3 | 0.98 | 0.96 |
| 4 | 0.72 | 0.95 |
| 5 | 1.06 | 0.91 |

TABLE 2

| Test No. | Item | Cultured yeast added (Day) | Salt-tolerant wild yeast (A) | Cultured yeast (B) | B/A (amplification) | Component Analysis | | | Aroma | Taste | Evaluation |
|---|---|---|---|---|---|---|---|---|---|---|---|
| | | | | | | Alc | Lac | PH | | | |
| 1 | Present invention | 0 | $2\times10^3$ | $2\times10^4$ | 10 | 3.63 | 0.92 | 4.85 | ⊙ | ⊙ | Good flavor |
| 2 | Present invention | 1 | $2\times10^3$ | $3\times10^4$ | 15 | 3.50 | 0.90 | 4.88 | ⊙ | ⊙ | Good flavor |
| 3 | Present invention | 3 | $5\times10^3$ | $6\times10^4$ | 12 | 3.55 | 0.87 | 4.88 | ⊙ | ⊙ | Good flavor |
| 4 | Present invention | 5 | $7\times10^3$ | $8\times10^4$ | 11 | 3.60 | 0.91 | 4.85 | ⊙ | ⊙ | Good flavor |
| 5 | Present ivention | 7 | $8\times10^3$ | $1\times10^5$ | 13 | 3.67 | 0.90 | 4.90 | ⊙ | ⊙ | Good flavor |
| 6 | Present invention | 10 | $1.2\times10^4$ | $1.5\times10^5$ | 13 | 3.65 | 0.88 | 4.90 | ○ | ○ | Good flavor |
| 7 | Comparative example 1 | 12 | $2.2\times10^4$ | $3\times10^5$ | 13 | 3.65 | 0.15 | 5.12 | ○ | Δ | Fuzzy |
| 8 | Comparative example 2 | 20 | $1.3\times10^5$ | $2\times10^6$ | 15 | 3.63 | 0.09 | 5.22 | ○ | X | Off-taste |

From the results in Table 2, it is preferable that soy sauce yeast is added within 10 days after mixing. It is clear that when soy sauce yeast is added upon mixing or within 7 days after mixing, soy sauce having a desired ethanol and lactic acid concentrations, and having a mellow flavor can be obtained.

Further, when soy sauce yeast is added later than 10 days after mixing, the number of wild yeast co-existing in a soy sauce moromi mash becomes extremely greater than the others, so that the addition of a larger amount of soy sauce yeast becomes inevitable. It is clear that, as a consequence because increased concentrations of yeast inhibit the growth of lactic acid bacteria, there is a disadvantage that soy sauce having low lactic acid content and poor flavor is obtained.

Example 3

Moromi mashes were prepared in the manner similar to Example 1. On the day following mixing, the moromi mash was agitated, and then wild yeast was added at $1\times10^3$ cells/g moromi, and lactic acid bacteria were added at $1\times10^6$ cells/g TABLE 3-continued

| | Lactic acid (W/V) % | |
|---|---|---|
| Experiment No. | Control | Present invention |
| Average | 0.93 | 0.94 |
| Standard deviation | 0.13 | 0.02 |

It is clear from the results shown in Table 3 that because lactic acid contents in the controls varied widely, soy sauce products having uniform lactic acid content was difficult to be obtained.

In contrast, it is clear that because lactic acid contents in the method of the present invention were almost the same, soy sauce products having uniform lactic acid content can be obtained.

Effect of the Invention

According to the present invention, soy sauce yeast is added to a soy sauce moromi mash such that the cell count of viable soy sauce yeast is 10 fold to 100 fold greater than that of wild yeast already existing in the moromi mash, so that yeast fermentation can be performed successfully without affecting lactic acid fermentation while suppressing the growth of the wild yeast and allowing only the added soy sauce yeast to actively grow.

Further, according to the present invention, soy sauce yeast is added to the soy sauce moromi mash within 10 days after mixing such that the cell count of the soy sauce yeast is 10 to 100 fold greater than that of the wild yeast already existing in the moromi mash. Thus, the above effects can be provided by the present invention by the addition of an extremely small amount of soy sauce yeast.

Furthermore, at this time, according to the present invention, the soy sauce yeast is added to the soy sauce moromi mash within 10 days after mixing such that the cell count of the soy yeast is 10 to 100 fold greater than that of wild yeast already existing in the moromi mash and is $2 \times 10^5$ or less cells/g moromi mash to the soy sauce moromi mash. Thus, ethanol fermentation is sufficiently performed by soy sauce yeast without suppressing lactic acid fermentation, so that soy sauce having a desired ethanol concentration (for example, 3% (V/V) or higher), a desired lactic acid concentration (for example, 0.8 to 1.0%), pH 4.6 to 4.9, and having a mellow flavor can be reliably obtained.

Moreover, even when soy sauce koji or moromi mashes differ because of different lots, the present invention makes it possible to reliably obtain desired soy sauces.

Only after setting a timing for addition of soy sauce yeast in the early days after mixing, particularly within 10 days after mixing, and determining the number of wild yeast already existing in the moromi mash, the proper quantity of soy sauce yeast with optimal ethanol fermentation ability to be added can be determined. Besides, there is no fear that a timing for addition of soy sauce yeast is delayed, so that the proper amounts of pure culture products of the soy sauce yeast can be prepared according to intent systematically.

Further, a judgment based on experts' experience and feel becomes unnecessary.

Furthermore, even when salt-tolerant wild yeast cannot be eliminated because of a limit to completely eliminate microorganisms from cleaned fermentation tanks and fermentation pathways, and a small number of the wild yeast remains and contaminates a soy sauce moromi mash, the addition of soy sauce yeast at a fixed rate greater than that of the other undesired yeast strains enables effective suppression of wild yeast proliferation and promotion of active proliferation of only the soy sauce yeast.

Further, the amount of soy sauce yeast to be added is always within the range that does not suppress lactic acid fermentation, so that lactic acid fermentation proceeds successfully and soy sauce having an appropriate lactic acid content can be obtained.

Accordingly, soy sauce having desired ethanol and lactic acid concentrations, and having a mellow flavor can be reliably obtained by applying the present invention to ordinary known methods for the brewing of soy sauces, such as strong-flavored soy sauce, weak-flavored soy sauce, white soy sauce, tamari soy sauce, re-fermentation soy Sauce or thick soy sauce.

All publications, patents and patent applications cited herein are incorporated herein by reference in their entirety.

What is claimed is:

1. A method of brewing soy sauce comprising the steps of:
   mixing prepared soy sauce koji into salt water wherein the salt is common salt, to prepare a soy sauce moromi mash;
   adding pre-cultured soy sauce lactic acid bacteria at $1 \times 10^4$ cells/g moromi to $1 \times 10^7$ cells/g moromi and soy sauce yeast to the moromi mash; and
   performing fermentation and aging of the moromi mash, wherein the soy sauce yeast is added to the soy sauce moromi mash such that the cell count of the soy sauce yeast is 10 to 100 fold greater than that of wild yeast already existing in the moromi mash.

2. A method of brewing soy sauce comprising the steps of:
   mixing prepared soy sauce koji into salt water wherein the salt is common salt, to prepare a soy sauce moromi mash;
   adding pre-cultured soy sauce lactic acid bacteria at $1 \times 10^4$ cells/g moromi to $1 \times 10^7$ cells/n moromi and soy sauce yeast to the moromi mash; and
   performing fermentation and aging of the moromi mash, wherein the soy sauce yeast is added to the soy sauce moromi mash within 10 days after the mixing such that the cell count of the soy sauce yeast is 10 to 100 fold greater than that of wild yeast already existing in the moromi mash.

3. A method of brewing soy sauce comprising the steps of:
   mixing prepared soy sauce koji into salt water wherein the salt is common salt, to prepare a soy sauce moromi mash;
   adding pre-cultured soy sauce lactic acid bacteria and soy sauce yeast to the moromi mash; and
   performing fermentation and aging of the moromi mash, wherein the soy sauce yeast is added to the soy sauce moromi mash within 10 days after mixing such that the cell count of the soy sauce yeast is 10 to 100 fold greater than that of wild yeast already existing in the moromi mash and is $2 \times 10^5$ or less cells/g moromi mash.

4. The method of brewing soy sauce according to claim 2, wherein said pre-cultured soy sauce lactic acid bacteria and soy sauce yeast are added to the moromi mash within 10 days after mixing.

5. The method of brewing soy sauce according to claim 4, wherein said pre-cultured soy sauce lactic acid bacteria and soy sauce yeast are added to the moromi mash at the time of mixing to next day after mixing.

6. The method of brewing soy sauce according to claim 3, wherein said pre-cultured soy sauce lactic acid bacteria and soy sauce yeast are added to the moromi mash within 10 days after mixing.

7. The method of brewing soy sauce according to claim 6, wherein said pre-cultured soy sauce lactic acid bacteria and soy sauce yeast are added to the moromi mash at the time of mixing to next day after mixing.

8. The method of brewing soy sauce according to claim 6 wherein the concentration of common salt in the moromi mash is 15 to 20% (W/V).

9. The method of brewing soy sauce according to claim 7 wherein the concentration of common salt in the moromi mash is 15 to 20% (W/V).

* * * * *